Oct. 15, 1963
S. J. STEIN ETAL
3,107,197
METHOD OF BONDING A METAL TO A PLASTIC
AND THE ARTICLE PRODUCED THEREBY
Filed June 5, 1957
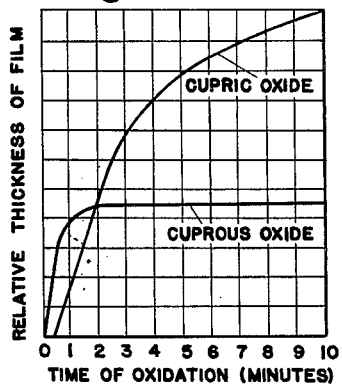
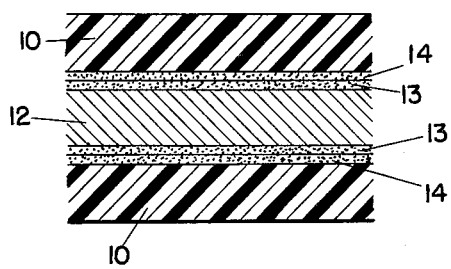
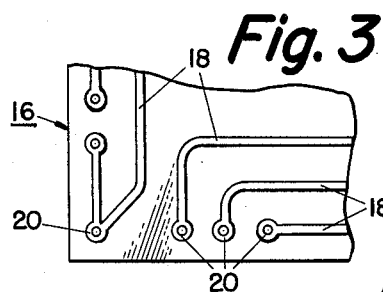
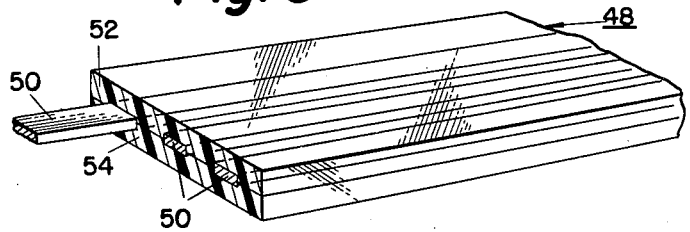
*INVENTORS*
SIDNEY J. STEIN
LOUIS B. ALLEN
BY
*Donald S. Cohen*
ATTORNEY United States Patent Office 3,107,197
Patented Oct. 15, 1963

3,107,197
METHOD OF BONDING A METAL TO A PLASTIC AND THE ARTICLE PRODUCED THEREBY
Sidney J. Stein, Philadelphia, Pa., and Louis B. Allen, Haddonfield, N.J., assignors to International Resistance Company, Philadelphia, Pa.
Filed June 5, 1957, Ser. No. 663,841
6 Claims. (Cl. 161—189)

This invention relates to a method of bonding a metal to a fluorocarbon plastic and the structure produced thereby. More particularly, it relates to a method of bonding copper to a solid polymer or copolymer containing substantial amounts of trifluorochloroethylene or the solid copolymer of tetrafluoroethylene and hexafluoropropylene. This application is a continuation-in-part of our co-pending application Serial No. 579,079, filed April 18, 1956, now abandoned.

As used herein the expressions "fluorocarbon plastics" and "plastics" are intended to signify both a solid polymer or co-polymer containing substantial amounts of the trifluorochloroethylene, hereinafter referred to by its tradename "Kel-F," and a solid copolymer of tetrafluoroethylene and hexafluoropropylene known by the Du Pont trade name "Teflon 100X" and equivalents of such materials.

It is known that Kel-F has physical chemical and electrical properties which make it very useful in the electrical field. For example, it is hard and tough but not brittle. It is a thermoplastic so that it can be easily molded into desired shapes and it has a high chemical stability, e.g. no effect being observed after prolonged exposure to concentrated sulfuric acid, hydrochloric acid, hydrofluoric acid, strong caustic solutions, fuming nitric acid, aqua regia and other vigorous oxidizing materials. Kel-F is also flexible and resilient, is not wetted by water and is unaffected by high humidity. Electrically, the plastic has a relatively low dielectric constant and low dielectric power loss as compared to many other plastics.

"Teflon 100X" offers the excellent combination of properties characteristic of the well known "Teflon" tetrafluoroethylene resins, e.g. low coefficient of friction, chemical inertness, exceptional dielectric properties, heat resistance, toughness and flexibility, zero moisture absorption and weather resistance. "Teflon 100X" differs from "Teflon" in that it softens at a lower temperature, approximately 545° F. to 563° F. for "Teflon 100X" as compared to approximately 700° F. for "Teflon" and more important that it softens to a melt where "Teflon" merely softens to a gel. Therefore "Teflon 100X" like Kel-F is considered a thermoplastic resin while "Teflon" is not. Since "Teflon 100X" does melt it can be molded or extruded using conventional techniques while "Teflon" requires special techniques for so handling. Therefore, since "Teflon 100X" has many of the excellent electrical and physical properties of "Teflon" and can be molded using conventional techniques, it is in practice a much more useful resin than "Teflon."

Many uses for such materials suggest themselves. Because of their good mechanical properties and chemical stability they make a good insulating support for printed circuits, now finding increasing application in radio and television sets. Because of their excellent dielectric properties they can be used for this purpose in low value capacitors or as the insulating material in hermetically sealed terminals to replace the glass or ceramic presently being used. Also, since they repel moisture they may form an excellent hermetic seal for electrical components such as resistors, capacitors and rectifiers. However, for practically all of these uses it is necessary to bond the fluorocarbon plastic to a metal, and since the plastics are not normally wettable, they do not readily adhere to other materials, particularly metals. Therefore, in the past the use of fluorocarbon plastics has been limited to those cases where a strong bond between the plastics and the metal is unnecessary.

It is therefore an object of this invention to provide a method of bonding metals to a fluorocarbon plastic. It is another object to provide a method of bonding metals to either polymerized trifluorochloroethylene or the copolymer of tetrafluoroethylene and hexafluoropropylene. It is still another object to provide a method of bonding copper to either polymerized trifluorochloroethylene or the copolymer of tetrafluoroethylene and hexafluoropropylene. It is a further object to provide a laminated article having a metal layer strongly bonded to a layer of either polymerized trifluorochloroethylene or the copolymer of tetrafluoroethylene and hexafluoropropylene. It is still a further object to provide a laminated article having a copper layer strongly bonded to a layer of either polymerized trifluorochloroethylene or the copolymer of tetrafluoroethylene and hexafluoropropylene. Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts, which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a graphic illustration of the formation of the oxide bonding agent,

FIGURE 2 is a sectional view of a laminated structure forming a part of this invention, FIGURE 3 is a top plan view of a printed circuit arrangement having features of our invention incorporated therein, FIGURE 4 is a partial sectional view of a hermetically sealed terminal incorporating certain features of our invention, FIGURE 5 is a longitudinal sectional view of a hermetically sealed electrical component, and FIGURE 6 is a fragmentary perspective view of a flexible multi-wire cable.

Similar reference characters refer to similar parts throughout the several views of the drawings.

In general, this invention is based on the discovery that cupric oxide will adhere well to solid layers of Kel-F, i.e., polymerized trifluorochloroethylene and "Teflon 100X," i.e., the copolymer of tetrafluoroethylene and hexafluoropropylene, upon the application of heat and pressure thereto. Thus a metal such as copper may be strongly bonded to these fluorocarbon plastics by providing a strongly adherent coating of cupric oxide on the metal surface. The metal is then placed on the plastic with this oxide layer contacting the plastic and upon applying heat and pressure to the laminate the desired bond is achieved. With copper the oxide can be formed by oxidizing its surface; other metals must be previously copper plated with copper after which the copper surface may be oxidized.

It has been found that although cupric oxide adheres well to the fluorocarbon plastic it does not do so with copper. It has also been discovered that the reverse is true of cuprous oxide which adheres well to copper but not to the plastic. Further, a strong bond can be obtained between cuprous oxide and cupric oxide. Ordinarily, copper will not adhere to the fluorocarbon plastics but a strong bond therebetween may be achieved by utilizing these discoveries. First a layer of cuprous oxide is applied to the copper and this is substantially covered with cupric oxide for bonding to the fluorocarbon plastic. Preferably a relatively thin layer of cupric oxide is provided for if too thick it becomes flaky and may peel away from the cuprous oxide. To do this we have found it desirable to form the cupric oxide by a slow and easily controllable process. Thus, in summation, what is desired is a slow and controllable process which will form on a copper sheet a first layer of cuprous oxide, and a strongly adherent layer of cupric oxide thereover. A chemical oxidizing agent is preferably used for this purpose and the preferred agent is a hot alkaline chlorite such as a water solution of a mixture of sodium hydroxide and sodium chlorite sold by the Enthone Corporation under the trademark "Ebonol-C Special." The strip or sheet of copper is immersed in the alkaline chlorite solution at a temperature of about 95° C. until it turns jet black; this takes from 3 to 10 minutes, depending upon the temperature, the strength and the age of the solution.

Turning to the drawings, in FIGURE 1 the manner of the oxide formation is graphically depicted from data obtained by X-ray diffraction. The relative thicknesses of the coats of cuprous and cupric oxides are plotted against time of immersion. Thus, when the copper is first immersed in the oxidizing solution, the coating of cuprous oxide increases rapidly through the first minute after which its thickness becomes constant. Meanwhile, the layer of cupric oxide gradually forms over the cuprous oxide, and, particularly after the first minute, it increases in thickness rapidly; the cupric oxide thickness begins to level off after approximately four minutes. The fact that the cuprous oxide thickness remains substantially constant while the cupric oxide layer continues to increase suggests the possibility that the cuprous oxide is oxidized to cupric oxide and simultaneously the copper is oxidized to cuprous oxide thereby maintaining a constant cuprous oxide thickness. The copper must not be removed from the solution until it is jet black for then there is a layer of cuprous oxide firmly bonded not only to the metal but also to the cupric oxide disposed thereover and this is compatible with and easily bonded to the fluorocarbon plastic. If the copper is removed from the solution before becoming jet black there will be insufficient cupric oxide to adhere well to the plastic. On the other hand, if the copper is left in the solution too long the cupric oxide becomes too thick and will flake off. Accordingly, once the copper has turned jet black it should be removed from the solution and thoroughly washed to stop the reaction. The copper thus oxidized is ready for bonding to the fluorocarbon plastic by application of heat and pressure in the usual manner.

This method of bonding copper to fluorocarbon plastics has been particularly successful when used with sheets of electrolytically deposited copper. More particularly, copper may be electrolytically disposed on a carbon plate and when it is removed therefrom the surface previously in contact with the plate is smooth while the other exposed surface is matte-like or rough in comparison. It has been found that the plastics may be bonded to the matte surface of these copper sheets much more effectively than to the smooth surface, although some less effective bonding may be achieved in the above manner on the smooth surface. The bond strength between the copper and the plastic may be determined by the weight necessary to pull a strip of copper 1 inch wide away from the plastic. Certain types of copper sheets have a substantially smooth surface with fine parallel straight lines running crosswise thereof in one direction. It has been found that if this surface is bonded to the plastic in the manner described above the copper may be pulled away from the plastic in a direction parallel to the lines with about half the force required to pull it therefrom in the opposite direction. This indicates that the irregular or rough surface adds materially in forming a strong bond between the copper and the plastic. Possibly this is because the crystalline structure of the cuprous oxide is such as to interfit with the irregularities on the surface of the copper to thereby aid in the formation of a strong bond.

In practice this oxidized copper strip may be placed on a strip of a fluorocarbon plastic and such laminate is then compressed at a temperature of about 450° to 540° F. for Kel-F and about 575° to 625° F. for "Teflon 100X." As the plastic reached its transition temperature range, a pressure of from 500 to 1000 pounds per square for Kel-F and about 50 to 500 pounds per square inch for "Teflon 100X" is applied and maintained until a strong bond between the strips is achieved, usually in one to three minutes. As the laminate cools the shrinkage of the layers differs and it might wrinkle with undersirable results such as, for example, stresses and possible ruptures in the bonding layer. To obviate this, the laminate should be cooled under pressure, preferably in a cooling press.

Another type of laminate may be made by a continuous process in which a strip of copper is fed first through an oxidizing bath and then through a washing bath. Lengths of fluorocarbon plastic strips may then be brought against the opposite sides of the oxidized copper strip and the laminate thus formed fed through rollers where heat and pressure are applied to bond the layers together. Thus there is provided a laminated article as shown in FIGURE 2 of the drawing comprising layers 10 of a fluorocarbon plastic such as Kel-F or "Teflon 100X" on the opposite sides of a layer of copper 12. Cuprous layers 13 are bonded to the copper while the cupric layers 14 achieve a bond with the plastic layers. It will, of course, be obvious that any number of alternate layers of copper and plastic may be bonded together in this fashion. Although "Teflon" does not adhere well to copper using the technique of this invention, by bonding a layer of "Teflon 100X" to the "Teflon," which can be accomplished under heat and pressure, a copper layer can then be bonded to the "Teflon 100X" in the manner previously described to obtain a copper to "Teflon" laminate. Obviously the "Teflon 100X" layer can be bonded to the copper layer and then the "Teflon" bonded to the "Teflon 100X."

In FIGURE 3, a printed wiring circuit generally indicated at 16 is shown. Thus a strip of a copper if first bonded to a sheet of a fluorocarbon plastic in the above manner and then a desired pattern of wiring strips 18 with enlarged terminal portions 20 may be achieved by chemical etching or any other desired method. Various electrical components, such as resistors, capacitors and rectifiers can be connected between the terminal portions 20 to provide desired circuits. To insulate and protect the wiring strips 18 and such connected components (not shown) an additional layer of the plastic can be placed thereover and bonded to the strips 18 in the same manner. This last plastic layer may have holes therethrough corresponding to terminal portions 20 to expose them for electrical connection.

In FIGURE 4, a hermetically sealed terminal member generally indicated at 22 is formed from a laminate made in accordance with the method described above. Thus terminal member 22 comprises a disk 24 or a fluorocarbon plastic having a centrally disposed projection 26 extending from one side thereof. Copper layers 28 and 30 are bonded to the opposite sides of the disk by a cuprous-cupric oxide bond and a terminal wire 32 extends centrally through the disk 24 and projection 26 to be connected to copper layer 28 by solder 34. Terminal member 22 may be used to terminate electrical components enclosed in a metal casing by inserting the projection 26 and terminal wire 32 through a hole therein and soldering to metal layer 30. Further member 22 may be molded to a fluorocarbon plastic casing containing an electrical component, either at the periphery of disk 24 or to projection 26 in a well known manner.

In FIGURE 5, there is shown a structure utilizing this bond for hermetically sealing a component such as a resistor or capacitor. Thus, a fluorocarbon plastic casing 36 which may be substantially cylindrical in shape encloses a component 38 such as a capacitor or a resistor having terminal wires 40 connected thereto and extending from the opposite ends of the casing. Fluorocarbon plastic disks 42 fit about the wire leads 40 and their inner surfaces have metal disks 44 bonded thereto in the above described manner. Wire leads 40 are connected to disks 44 by solder connections 46 and plastic disks 42 are molded to casing 36 in the usual manner as by the application of pressure and heat. Thus disks 42 becomes an integral part of casing 36 and the hermetic seal for the component 38 is completed by the solder connection 46 between leads 40 and disks 44.

It has been found that the above process for bonding copper to fluorocarbon plastic is particularly useful in the formation of fluorocarbon plastic insulated copper wire. The wire may be oxidized in the above described manner after which the plastic may be extruded thereabout to form a strong bond with the wire. In a Kel-F insulated wire made in this manner the oxide layer serves an additional function besides being the bonding agent. At elevated temperatures copper has a tendency to attack Kel-F causing some degradation but with this oxide coating formed on the wire, the wire is protected against any such action. In FIGURE 6 there is shown such a multi-wire flexible cable generally indicated at 48. Thus, copper wires 50 are spaced in parallel relation and sandwiched between fluorocarbon plastic sheets 52 and 54. The wires 50 may take any convenient shape being shown as rectangular strips. This cable may be formed by a continuous process by first feeding the wires through an oxidizing bath subsequently cleaning the oxidized surface and then feeding the wires between the two strips 52 and 54 of the fluorocarbon plastic, the assembly being passed through rollers for application of pressure and heat to form the bond.

It will thus be seen that the objects set forth above among those made apparent from the preceding description are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements on the scope of the invention which, as a matter of language, might be said to fall therebetween.

Having described our invention in what we claim as new and desire to secure by Letters Patent is:

1. An electrical component comprising the combination of a piece of trifluorochloroethylene bonded to a copper element, said copper element having a surface bonded under heat and pressure to said piece of trifluorochloroethylene by copper oxide interposed between said surface and said piece to form a bond therebetween, said copper oxide comprising a layer of cuprous oxide adhering to said copper surface, a layer of black cupric oxide adhering to said cuprous oxide and to said trifluorochloroethylene.

2. An electrical component comprising the combination of a piece of a copolymer of tetrafluoroethylene and hexafluoropropylene bonded to a copper element, said copper element having a surface bonded under heat and pressure to said piece of a copolymer of tetrafluoroethylene and hexafluoropropylene by copper oxide interposed between said surface and said piece to form a bond therebetween, said copper oxide comprising a layer of cuprous oxide adhering to said copper surface, a layer of black cupric oxide adhering to said cuprous oxide and to said piece of copolymer of tetrafluoroethylene and hexafluoropropylene.

3. An electric assembly having the form of a preformed effectively integral thin panel having a width and length many times its thickness and over-all dimensions suitable for a given application, the panel comprising a base of a copolymer of tetrafluoroethylene and hexafluoropropylene, and a thin flat conductor of copper arranged to define an electrically conducting path on the face of the base, the conductor having surfaces of adherent black copper oxide effectively integral therewith to which the base is directly bonded.

4. A method of bonding a member having a copper surface to a polymer of trifluorochloroethylene comprising the steps of treating said copper surface with an aqueous alkaline oxidizing solution until a jet black adherent copper oxide layer substantially covers said copper surface, removing said oxidizing solution, applying a preformed element of said polymer to said copper oxide layer, then compressing said polymer element and said member under heat to form a unitary bonded article, and then cooling said bonded article.

5. A method of bonding a member having a copper surface to a copolymer of tetrafluoroethylene and hexafluoropropylene comprising the steps of treating said copper surface with an aqueous alkaline oxidizing solution until a jet black adherent copper oxide layer substantially covers said copper surface, removing said oxidizing solution, applying a preformed element of said copolymer of tetrafluoroethylene and hexafluoropropylene to said copper oxide layer, then compressing said copolymer of tetrafluoroethylene and hexafluoropropylene element and said member under heat to form a unitary bonded article, and then cooling said bonded article.

6. An electrical component comprising the combination of a piece selected from the group consisting of trifluorochloroethylene and a copolymer of tetrafluoroethylene and hexafluoropropylene bonded to a copper element, said copper element having a surface bonded under heat and pressure to said piece by copper oxide interposed between said surface and said piece to form a bond therebetween, said copper oxide comprising a layer of cuprous oxide adhering to said copper surface, a layer of black cupric oxide adhering to said cuprous oxide and to said piece.

References Cited in the file of this patent

UNITED STATES PATENTS

| | | |
|---|---|---|
| 2,097,298 | Meyers | Oct. 26, 1937 |
| 2,129,410 | Dowling | Sept. 6, 1938 |
| 2,276,647 | Conrad et al. | Mar. 17, 1942 |
| 2,364,993 | Meyer | Dec. 12, 1944 |
| 2,481,854 | MacMahon | Sept. 13, 1949 |
| 2,529,414 | Pfeffer | Nov. 7, 1950 |
| 2,551,591 | Foord | May 8, 1951 |
| 2,593,922 | Robinson | Apr. 22, 1952 |
| 2,686,738 | Teeters | Aug. 17, 1954 |
| 2,736,680 | Kidwell | Feb. 28, 1956 |
| 2,745,898 | Hurd | May 15, 1956 |
| 2,754,353 | Gilliam | July 10, 1956 |
| 2,833,686 | Sandt | May 6, 1958 |
| 2,884,161 | Hurd et al. | Apr. 28, 1959 |
| 2,932,599 | Dahlgren | Apr. 12, 1960 |